(12) United States Patent
Chang et al.

(10) Patent No.: US 8,797,653 B2
(45) Date of Patent: Aug. 5, 2014

(54) DEVICE AND METHOD FOR CONTROLLING CURVATURE OF LENS SURFACE

(75) Inventors: Jong-hyeon Chang, Suwon-si (KR); Seung-wan Lee, Suwon-si (KR); Woon-bae Kim, Seoul (KR); Min-seog Choi, Seoul (KR); Eun-sung Lee, Hwaseong-si (KR); Kyu-dong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 13/570,888

(22) Filed: Aug. 9, 2012

(65) Prior Publication Data

US 2013/0038944 A1 Feb. 14, 2013

(30) Foreign Application Priority Data

Aug. 9, 2011 (KR) ........................ 10-2011-0079154

(51) Int. Cl.
*G02B 3/12* (2006.01)
*G02B 26/00* (2006.01)

(52) U.S. Cl.
CPC ............ *G02B 26/004* (2013.01); *G02B 26/005* (2013.01); *G02B 3/12* (2013.01)
USPC ........................................................ 359/665

(58) Field of Classification Search
CPC .......... G02B 3/12; G02B 3/14; G02B 26/004; G02B 26/005
USPC .......................................... 359/665, 666, 667
See application file for complete search history.

(56) References Cited

U.S. PATENT DOCUMENTS

| 7,126,903 | B2 | 10/2006 | Feenstra et al. | |
|---|---|---|---|---|
| 7,898,742 | B2* | 3/2011 | Rodriguez Fernandez et al. | 359/666 |
| 8,111,465 | B2* | 2/2012 | Heikenfeld et al. | 359/665 |
| 8,111,466 | B2* | 2/2012 | Rodriguez Fernandez et al. | 359/666 |

FOREIGN PATENT DOCUMENTS

| JP | 2002-6200 A | 1/2002 |
|---|---|---|
| JP | 2010-171450 A | 8/2010 |
| KR | 10-2005-0059291 A | 6/2005 |
| KR | 10-2006-0017055 A | 2/2006 |

OTHER PUBLICATIONS

B. Berge, Liquid Lens Technology: Principle of Electrowetting Based Lenses and Applications to Imaging, Micro Electro Mechanical Systems, 2005, pp. 227-230, Varioptic, Lyon, France.

(Continued)

*Primary Examiner* — David N Spector
(74) *Attorney, Agent, or Firm* — Sughrue Mion, PLLC

(57) ABSTRACT

A curvature control device includes a first fluid that has a light transmitting property and a polar property; a second fluid that has a light transmitting property; a chamber that the first fluid and the second fluid are accommodated without being mixed with each other, wherein a boundary surface between the first fluid and the second fluid comprises a first surface that is a lens surface and a second surface that induces a change in a curvature of the first surface; a first intermediate plate that is disposed in the chamber, and includes a first through-hole that forms a diameter of a lens corresponding to the first surface and a second through-hole that forms a path of the second fluid; and an electrode portion configured to generate an electric field that changes a position of the second surface.

25 Claims, 12 Drawing Sheets

(56) References Cited

OTHER PUBLICATIONS

Seung Tae Choi, Jeong Yub Lee, Jong Oh Kwon, Seungwan Lee, and Woonbae Kim, Varifocal liquid-filled microlens operated by an electroactive polymer actuator, Optics Letters, May 15, 2011, pp. 1920-1922, vol. 36 No. 10, Optical Society of America.

B. Berge and J. Peseux, Variable focal lens controlled by an external voltage: An application of electrowetting, The European Physical Journal E, 2000, pp. 159-163, P Sciences, Società Italiana di Fisica, Springer-Verlag.

Nam-Trung Nguyen, Micro-optofluidic Lenses: A review, Biomicrofluidics 4, 2010, pp. 031501-031501-15, American Institute of Physics.

S. Kuiper and B.H.W. Hendriks, Variable-focus liquid lens for miniature cameras, Applied Physics Letters, 2004, pp. 1128-1130, vol. 85 No. 7, American Institute of Physics.

* cited by examiner

DEVICE AND METHOD FOR CONTROLLING CURVATURE OF LENS SURFACE

CROSS-REFERENCE TO RELATED APPLICATION

This application claims priority from Korean Patent Application No. 10-2011-0079154, filed on Aug. 9, 2011, in the Korean Intellectual Property Office, the disclosures of which are incorporated herein in their entirety by reference.

BACKGROUND

1. Field

Devices and methods consistent with the present disclosure relate to a device for controlling a curvature of a lens surface by using a micro-electro-fluidic method and a method of controlling a curvature of a lens surface.

2. Description of the Related Art

A lens is a basic component of various kinds of imaging apparatuses such as cameras or the like, and collects or disperses light by refracting light at a boundary surface between two different mediums.

A focal length of a lens is determined according to the curvature of the lens surface and a material for forming the lens. Recently, in order to obtain an image having a higher quality, the demand for a lens system having a variable focusing function has increased. The variable focusing function may be used in auto-focusing or zooming. The auto-focusing or zooming may use a method of mechanically moving some lenses constituting the lens system by using, for example, a motor, or may use a method of changing the curvature of the lens surface by using a liquid lens.

The liquid lens includes a pressure type liquid lens, an electrowetting type liquid lens, and the like according to a driving method of changing the curvature of a lens surface. The pressure type liquid lens changes the curvature of a lens surface by applying pressure to a liquid by using a pump or an actuator. The electrowetting type liquid lens changes a contact angle of liquid by applying a voltage between a conductive liquid and a driving electrode coated with a dielectric material and thus changes the curvature of a lens surface.

SUMMARY

Embodiments provide a device for controlling the curvature of a lens surface by using a micro-electro-fluidic method and a method of controlling the curvature of a lens surface.

According to an aspect of an embodiment, there is provided a curvature control device including a first fluid having a light transmitting property and a polar property; a second fluid that has a light transmitting property and is not mixed with the first fluid; a chamber having an internal space accommodating the first fluid and the second fluid, wherein a boundary surface between the first fluid and the second fluid is comprised of a first surface that is a lens surface and a second surface that induces a change in a curvature of the lens surface; a first intermediate plate formed in the chamber, wherein a first through-hole for forming a diameter of a lens corresponding to the lens surface and a second through-hole for forming a path of the second fluid are formed in the first intermediate plate; and an electrode portion for forming an electric field for changing a position of the second surface.

The first fluid may be a polar liquid, and the second fluid may be a gas or a non-polar liquid.

The curvature control device may further include a ground electrode disposed to contact the first fluid.

The curvature control device may further include a lower substrate and an upper substrate respectively disposed under and on the first intermediate plate; and a spacer portion formed between the lower substrate and the first intermediate plate and between the first intermediate plate and the upper substrate so as to form the internal space of the curvature control device.

The electrode portion may include a first electrode portion including at least one electrode which is formed on the lower substrate and is coated with an insulating material.

The electrode portion may further include a second electrode portion including at least one electrode which is formed under the first intermediate plate and is coated with an insulating material.

The electrode portion may include the second electrode portion including at least one electrode which is formed under the first intermediate plate and is coated with an insulating material.

The at least one electrode of the first electrode portion may have a ring shape.

The at least one electrode of the second electrode portion may have a ring shape.

A step forming substrate is further formed on the lower substrate, and a third through-hole corresponding to the first through-hole is formed in the step forming substrate.

The electrode portion may include the first electrode portion including at least one electrode which is formed on the step forming substrate and is coated with an insulating material.

The electrode portion may further include a second electrode portion including at least one electrode which is formed under the first intermediate plate and is coated with an insulating material.

The electrode portion may include the second electrode portion including at least one electrode which is formed under the first intermediate plate and is coated with an insulating material.

The at least one electrode of the first electrode portion has a ring shape.

The at least one electrode of the second electrode portion has a ring shape.

The curvature control device may further include at least one second intermediate plate disposed between the lower substrate and the first intermediate plate, wherein through-holes respectively corresponding to the first through-hole and the second through-hole are formed in the second intermediate plate.

The electrode portion may include: a first electrode portion including at least one electrode which is formed on the lower substrate and is coated with an insulating material; and a second electrode portion which is formed at least any one of under the first intermediate plate and on the second intermediate plate adjacent to the first intermediate plate and includes at least one electrode coated with an insulating material.

The electrode portion may further include a third electrode portion including at least one electrode which is formed under the second intermediate plate adjacent to the lower substrate and may be coated with an insulating material.

The at least one electrode of the first and second electrode portions has a ring shape.

The at least one electrode of the third electrode portion has a ring shape.

According to an aspect of the another embodiment, there is provided an imaging apparatus including an imaging lens unit including the curvature control device of claim 1; a control unit for controlling a voltage for adjusting a curvature of a lens surface of the curvature control device; and an image sensor for converting an optical image formed by the imaging lens unit into an electrical signal.

According to an aspect of another embodiment, there is provided a curvature control method including preparing a chamber having an electrode portion including an electrode coated with an insulating material, and first and second fluids which are to be accommodated in the chamber, have light transmitting properties, and are not mixed with each other; disposing the first and second fluids in the chamber so that a boundary surface between the first fluid and the second fluid is comprised of a first surface, which is a lens surface, and a second surface contacting the electrode portion; and controlling a curvature of the lens surface by changing a position of the second surface by applying a voltage to the electrode portion.

The first fluid may be a polar liquid, and the second fluid may be a gas or a non-polar liquid.

The curvature of the lens surface may be controlled by adjusting a magnitude of the voltage applied to the electrode portion.

The electrode portion may include a plurality of electrodes, and a voltage is selectively applied to some of the electrodes to control the curvature of the lens surface.

BRIEF DESCRIPTION OF THE DRAWINGS

The above and/or other aspects will become apparent and more readily appreciated from the following description of embodiments, taken in conjunction with the accompanying drawings of which.

DETAILED DESCRIPTION OF EXEMPLARY EMBODIMENTS

Figure 1:
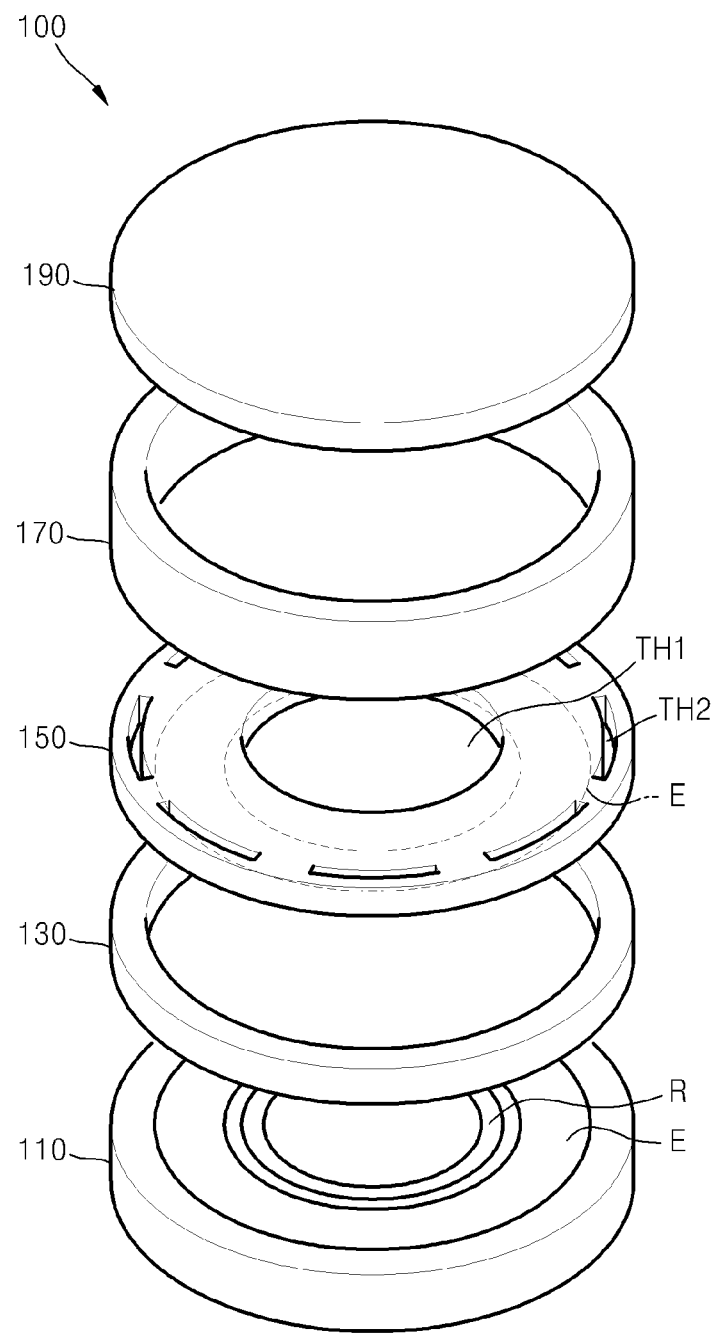
FIG. 1 is a schematic exploded perspective view of a curvature control device, according to an embodiment.

Hereinafter, various embodiments will be described in detail with reference to the attached drawings. The same reference numerals in the drawings denote the same element. In the drawings, the thicknesses of layers and regions are exaggerated for clarity.

According to an embodiment of a curvature control method, first, a chamber C and first and second fluids are prepared. The chamber C has an electrode portion including an electrode coated with an insulating material. The first and second fluids are accommodated in the chamber C, have light transmitting properties, and are not mixed with each other, i.e., the first fluid is immiscible with the second fluid. Then, the first and second fluids are disposed in the chamber C so that a boundary surface between the first fluid and the second fluid is comprised of a first surface, which is a lens surface, and a second surface contacting the electrode portion. Then, a voltage is applied to the electrode portion to move the second surface, thereby controlling the curvature of the lens surface.

A curvature control device using the above-described curvature control method may be configured in any of various forms according to a detailed structure of the chamber C in which the first and second fluids are accommodated and an arrangement of the electrode included in the electrode portion for driving the boundary surface between the first fluid and the second fluid. Hereinafter, various exemplary embodiments of the curvature control device will be described.

Figure 2A:
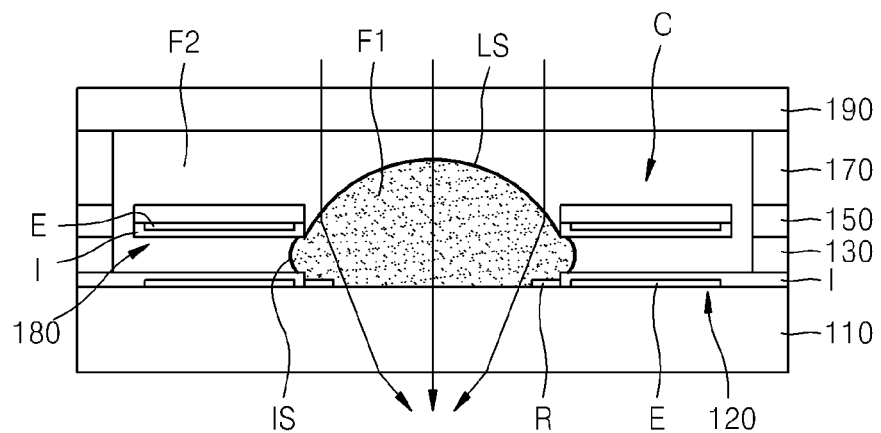
FIGS. 2A to 2C are schematic cross-sectional views of the curvature control device of FIG. 1, wherein a lens surface has a different curvature according to a magnitude of an applied voltage.
Figure 2B:
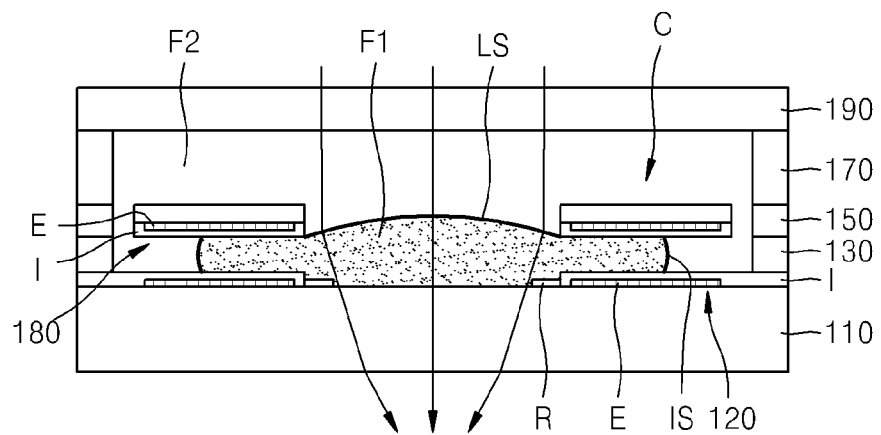
Figure 2C:
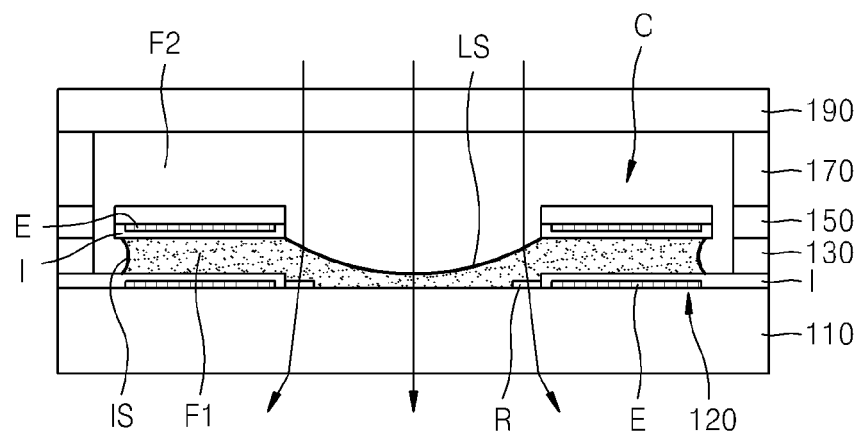

FIG. 1 is a schematic exploded perspective view of a curvature control device 100, according to an embodiment. FIGS. 2A to 2C are schematic cross-sectional views of the curvature control device 100 of FIG. 1, wherein a lens surface has a different curvature according to a magnitude of an applied voltage. For convenience of illustration, some components are omitted in FIG. 1.

Referring to FIG. 1, FIGS. 2A to 2C, a first fluid F1, which has a light transmitting property and a polar property, and a second fluid F2, which has a light transmitting property and is not mixed with the first fluid F1, are disposed in a chamber C. A boundary surface between the first fluid F1 and the second fluid F2 includes a first surface LS, which is the lens surface, and a second surface IS inducing a change in the curvature of the lens surface. Also, an electrode portion for forming an electric field for changing a position of the second surface IS is disposed in the chamber C. A first intermediate plate 150 is disposed in the chamber C so that the boundary surface between the first fluid F1 and the second fluid F2 may form the first surface LS, which is the lens surface, and the second surface IS inducing a change in the curvature of the lens surface, wherein a first through-hole TH1 for forming a diameter of a lens corresponding to the lens surface and a second through-hole TH2 for forming a path of the second fluid F2 are formed in the first intermediate plate 150. The number and shape of the second through-hole TH2 are not limited thereto.

A lower substrate 110 and an upper substrate 190 may be respectively disposed under and on the first intermediate plate 150. A spacer portion may be formed between the lower substrate 110 and the first intermediate plate 150 and between the first intermediate plate 150 and the upper substrate 190 so as to form an internal space of the curvature control device 100. The spacer portion includes a first spacer 130 disposed between the lower substrate 110 and the first intermediate plate 150 and a second spacer 170 disposed between the first intermediate plate 150 and the upper substrate 190.

Hereinafter, a detailed configuration and effect of the curvature control device 100 will be described.

The lower substrate 110, the first intermediate plate 150, and the upper substrate 190 may be formed of a light transmitting material.

The first fluid F1 and the second fluid F2 may be formed of light transmitting fluids having different refractive indexes, respectively. The first fluid F1 may be formed of polar liquid and the second fluid F2 may be formed of gas or non-polar liquid.

The electrode portion, as illustrated in FIGS. 2A to 2C, includes a first electrode portion 120 and a second electrode portion 180. The first electrode portion 120 includes an electrode E which is disposed on the lower substrate 110 and is coated with an insulating material I. The second electrode portion 180 includes an electrode E which is disposed under the first intermediate plate 150 and is coated with an insulating material I. However, the exemplary embodiments are not limited thereto, and thus, the electrode portion may include only one of the first electrode portion 120 and the second electrode portion 180.

Also, the electrode portion may further include a ground electrode R disposed to contact the first fluid F1. Referring to FIG. 1, the ground electrode R is disposed on the lower substrate 110 and has a ring shape. However, the ground electrode R may be disposed in an area where the ground electrode R contacts the first fluid F1, and the shape of the ground electrode R is not limited to the ring shape. The ground electrode R may be selectively included in the curvature control device 100, and when the ground electrode R is included in the curvature control device 100, a driving voltage may further be reduced.

The first electrode portion 120 and the second electrode portion 180 may be electrodes formed of a transparent conductive material, for example, metal oxide such as indium tin oxide (ITO), indium zinc oxide (IZO), or the like; a metal nanoparticle dispersion thin film such as gold (Au), silver (Ag), or the like; a carbon nanostructure such as carbon nanotube (CNT), graphene, or the like; or a conductive high molecular material such as poly(3,4-ethylenedioxythiophene) (PEDOT), polypyrrole (PPy), poly(3-hexylthiophene) (P3HT), or the like. The ground electrode R may be formed of the above-described transparent conductive material, and when the ground electrode R does not need to have a light transmitting property due to its position, the ground electrode R may be formed of a metal thin film such as Au, Ag, aluminum (Al), chrome (Cr), titanium (Ti), or the like.

In the curvature control device 100, pressure applied to the second surface IS changes due to electrowetting driving, and thus curvature of the first surface LS, which is the lens surface, is controlled. An electrowetting phenomenon refers to a phenomenon where a contact angle of liquid is changed according to a voltage applied to an electrolyte droplet on an electrode coated with insulation. That is, on a three-phase contact line (TCL) where a fluid, droplet, and insulation contact with one another, a contact angle is changed according to respective interfacial tensions. When the electrowetting phenomenon is used, movement of the fluid may be rapidly and effectively controlled using a low voltage and the fluid may be reversibly transferred and controlled.

In the curvature control device 100 of FIGS. 2A to 2C, the first electrode portion 120 and the second electrode portion 180 are each formed of one electrode E, and a position of the second surface IS is changed by controlling a magnitude of a voltage applied to the electrode E. That is, when no voltage is applied to any of the electrodes E, the first surface LS, which is the lens surface, has a maximum convex curvature according to a position of the second surface IS as illustrated in FIG. 2A. When a voltage having a predetermined magnitude is applied to the electrode E, the second surface IS moves bilaterally, and the curvature of the second surface LS is reduced as illustrated in FIG. 2B. When an applied voltage is maximized, a movement of the second surface LS is bilaterally maximized as illustrated in FIG. 2C and the first surface LS has a concave curvature.

Figure 3A:
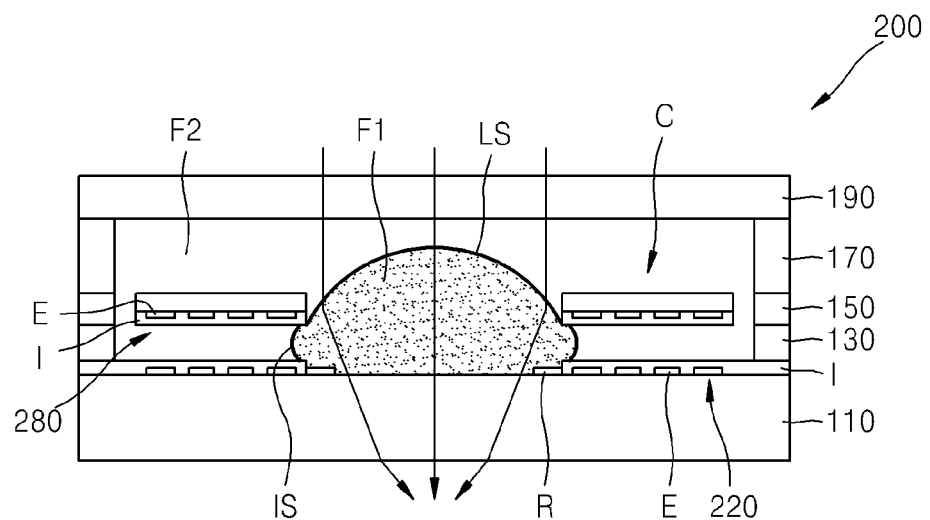
FIGS. 3A to 3C are schematic cross-sectional views of a curvature control device according to another embodiment, wherein a lens surface has a different curvature according to selection of an electrode for an applied voltage.
Figure 3B:
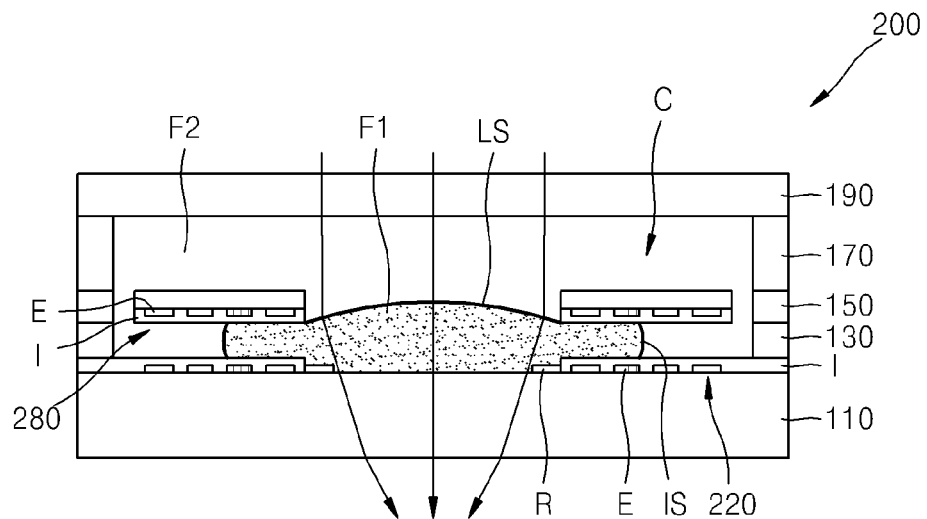
Figure 3C:
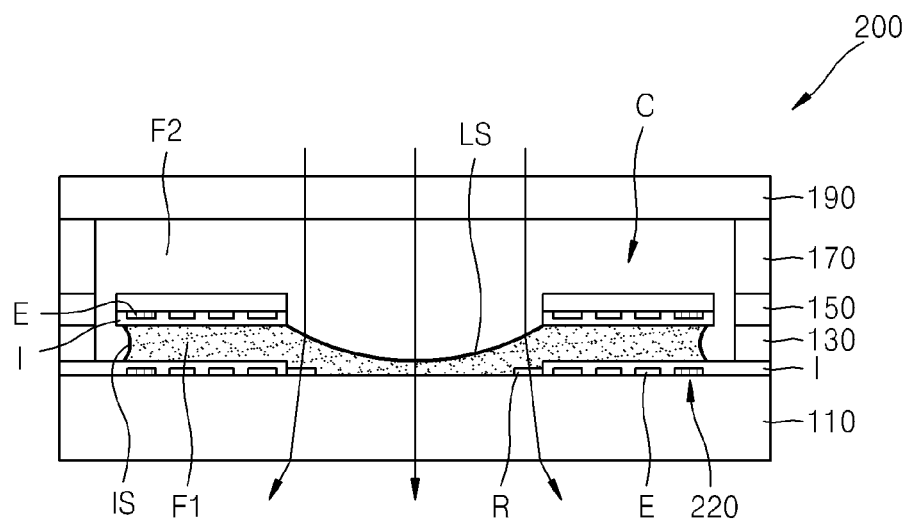

FIGS. 3A to 3C are schematic cross-sectional views of a curvature control device 200 according to another embodiment, wherein a lens surface has a different curvature according to selection of an electrode for an applied voltage. FIGS. 4A to 4F are views illustrating arrangements of electrodes at an electrode portion that may be employed in the curvature control device 200 illustrated in FIGS. 3A to 3C.

The curvature control device 200 of FIGS. 3A to 3C is different from the curvature control device 100 described with reference to FIGS. 1 to 2C in that a first electrode portion 220 and a second electrode portion 280 are each formed of a plurality of electrodes E each coated with an insulating material I. A voltage may be selectively applied to some of the electrodes E constituting the first electrode portion 220 and the second electrode portion 280 so as to control a curvature of a first surface LS, which is a lens surface, in a digital way.

When no voltage is applied to any of the electrodes E as illustrated in FIG. 3A, the lens surface has a maximum convex curvature. When a proper voltage is applied to one of the electrodes E as illustrated in FIG. 3B, an electro-mechanical force is applied to a TCL of an activated driving electrode, that is, on a contact line between a second surface IS, which is a boundary surface between a first fluid F1 and a second fluid F2, and the insulating material I, and thus, the second surface IS is moved bilaterally, thereby reducing a curvature of the first surface LS. When a proper voltage is applied to the electrodes E disposed at an outermost side, the second surface IS is bilaterally moved as much as possible, and the second surface LS has a concave curvature.

In FIGS. 3A to 3C, the curvature control device 200 includes the first electrode portion 220, the second electrode portion 280, and the ground electrode R. However, the exemplary embodiments are not limited thereto, and thus, the curvature control device 200 may include only one of the first electrode portion 220 and the second electrode portion 280, and the ground electrode R may be omitted.

Figure 4A:
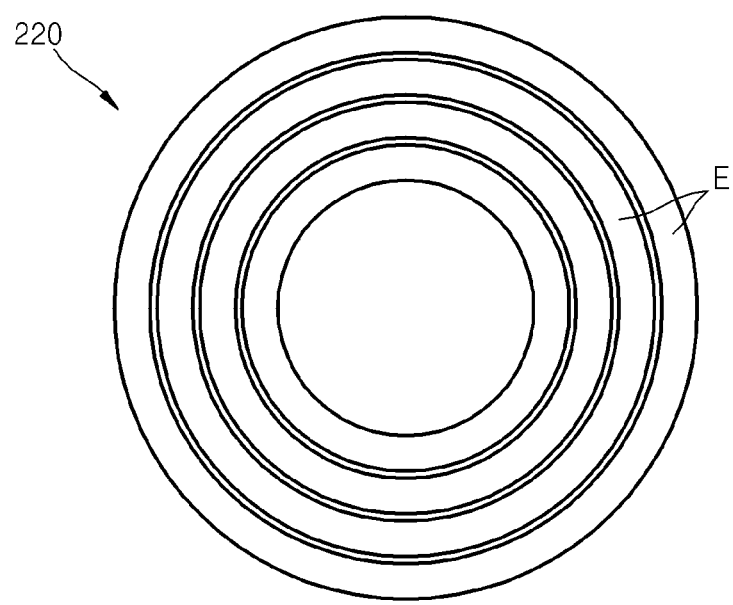
FIGS. 4A to 4F are views illustrating arrangements of electrodes at an electrode portion that may be employed in the curvature control device illustrated in FIGS. 3A to 3C.
Figure 4B:
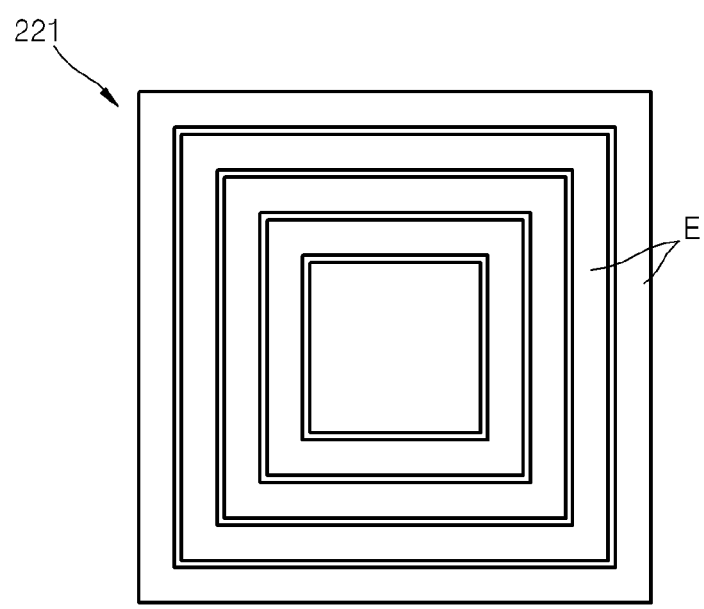
Figure 4C:
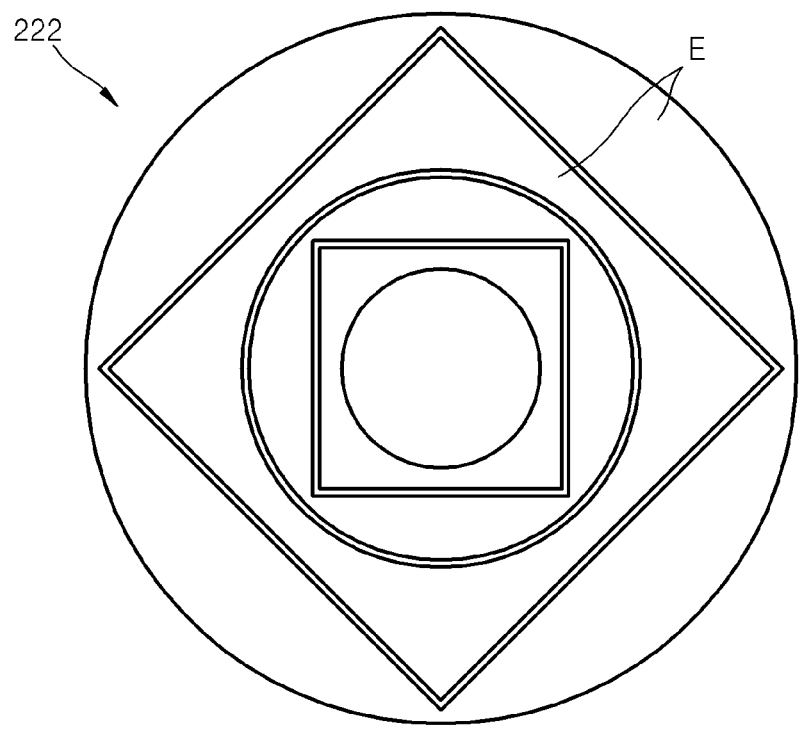
Figure 4D:
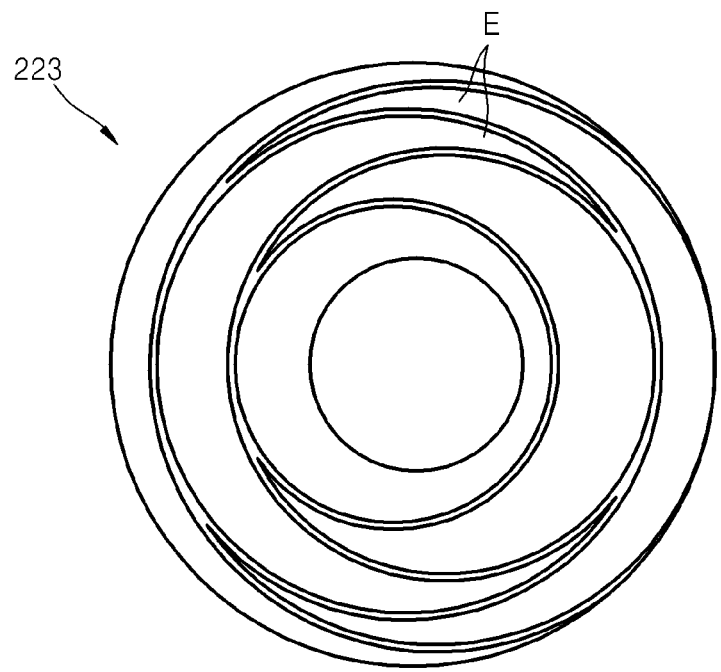
Figure 4E:
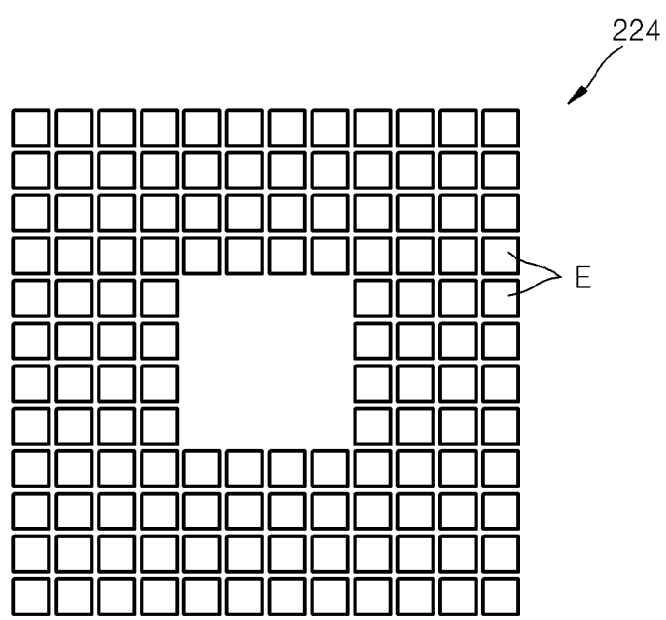
Figure 4F:
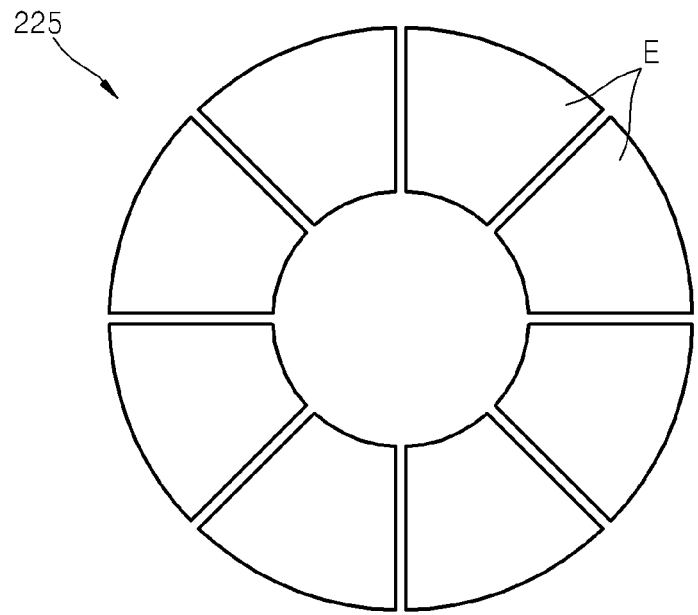

Also, the plurality of electrodes E constituting the first electrode portion 220 and the second electrode portion 280 may each have a ring shape as illustrated in FIG. 4A. An electrode portion 221 may include a plurality of electrodes E each having a rectangular annular shape as illustrated in FIG. 4B. Also, an electrode portion 222 may include a plurality of ring-shaped electrodes E and a plurality of rectangular annular-shaped electrodes E as illustrated in FIG. 4C. In FIG. 4C, the ring-shaped electrodes E have the same center. However, the exemplary embodiments are not limited thereto, and the centers of the electrodes E may be different from one another. Also, an electrode portion 223 may be comprised of a plurality of electrodes E illustrated in FIG. 4D. An electrode portion 224 illustrated in FIG. 4E includes a plurality of electrodes E arranged in a two-dimensional array. A voltage may be applied to some of the electrodes E so as to control a shape of a lens surface in various ways. In addition, as illustrated in FIG. 4F, an electrode portion 225 may include a plurality of electrodes E arranged in a circumferential direction.

Figure 5A:
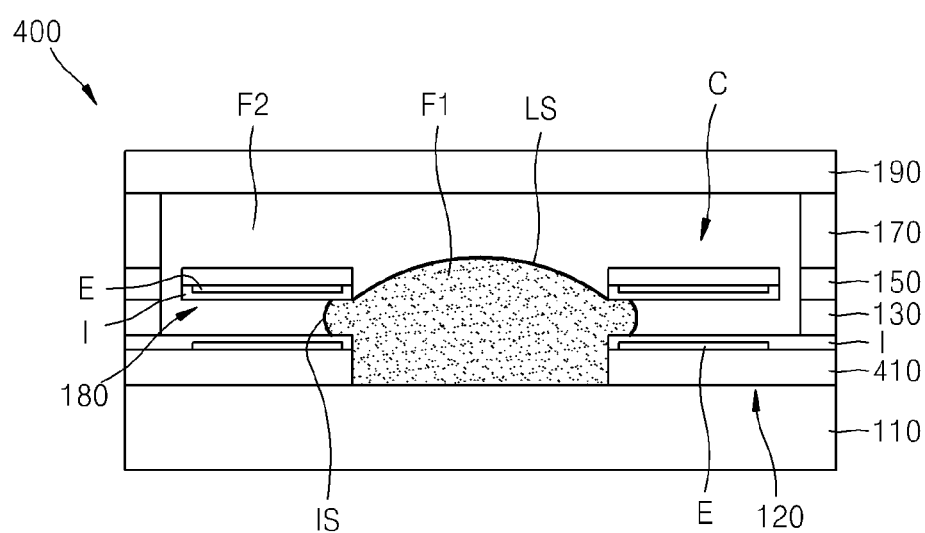
FIGS. 5A and 5B are schematic cross-sectional views of a curvature control device according to another embodiment, wherein a lens surface has a different curvature according to an applied voltage.
Figure 5B:
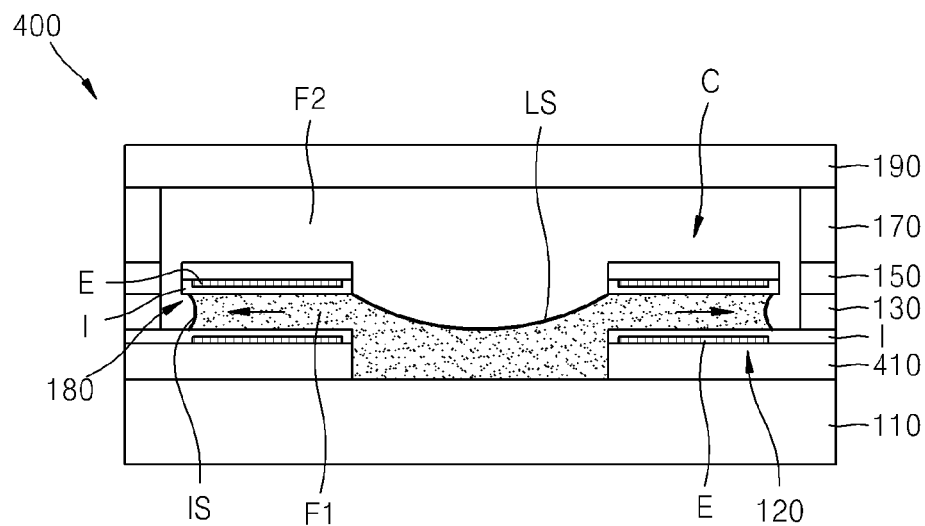

FIGS. 5A and 5B are schematic cross-sectional views of a curvature control device 400 according to another embodiment, wherein a lens surface has a different curvature according to an applied voltage.

The curvature control device 400 of FIGS. 5A and 5B is different from the curvature control devices 100 and 200 described with reference to FIGS. 1 to 3C in that a step forming substrate 410 is further provided on a lower substrate 110 in order to maximize a change in a curvature of the lens surface.

A through-hole corresponding to a first through-hole TH1 formed in a first intermediate plate 150 is formed in the step forming substrate 410, and thus, the curvature control device 400 may be driven in such a way that a first surface LS, which is the lens surface, has a more concave curvature.

An electrode portion may include a first electrode portion 120 and a second electrode portion 180. The first electrode portion 120 includes an electrode E which is formed on the step forming substrate 410 and is coated with an insulating material I, and the second electrode portion 180 includes an electrode E which is formed under the first intermediate plate 150 and is coated with an insulating material I. The electrode portion may include one of the first electrode portion 120 and the second electrode portion 180, or alternatively, the electrode portion may further include a ground electrode (not shown). Also, the lower substrate 110 may be integrally formed with the step forming substrate 410.

Figure 6A:
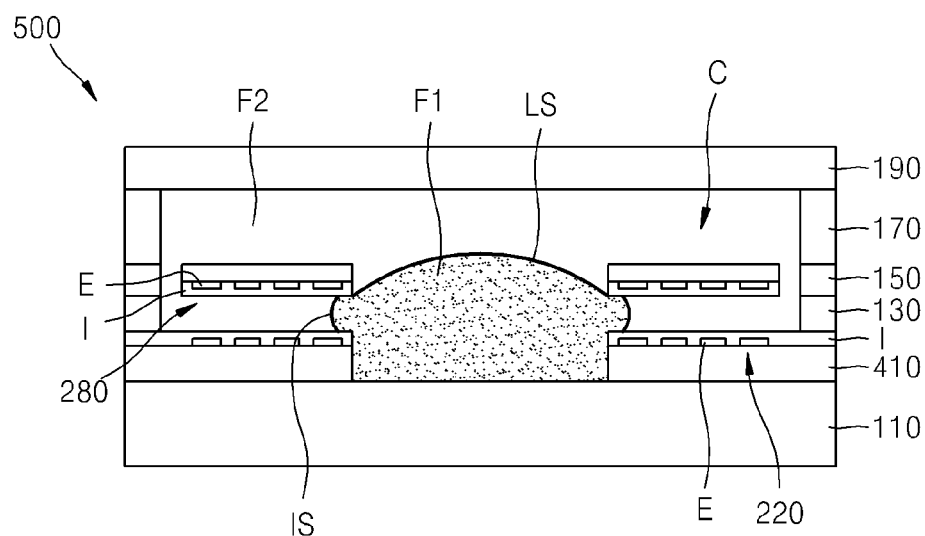
FIGS. 6A and 6B are schematic cross-sectional views of a curvature control device according to another embodiment, wherein a lens surface has a different curvature according to an applied voltage.
Figure 6B:
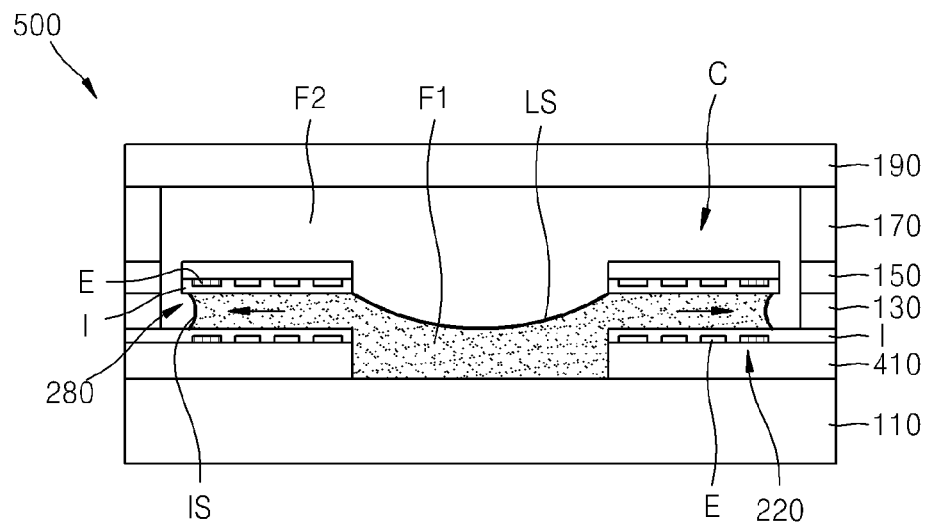

FIGS. 6A and 6B are schematic cross-sectional views of a curvature control device 500 according to another embodiment, wherein a lens surface has a different curvature according to an applied voltage.

In FIGS. 6A and 6B, the first electrode portion 220 and the second electrode portion 280 are each formed of a plurality of the electrodes E, and thus, a curvature of the lens surface is digitally-controlled according to selection of the electrode E.

Figure 7A:
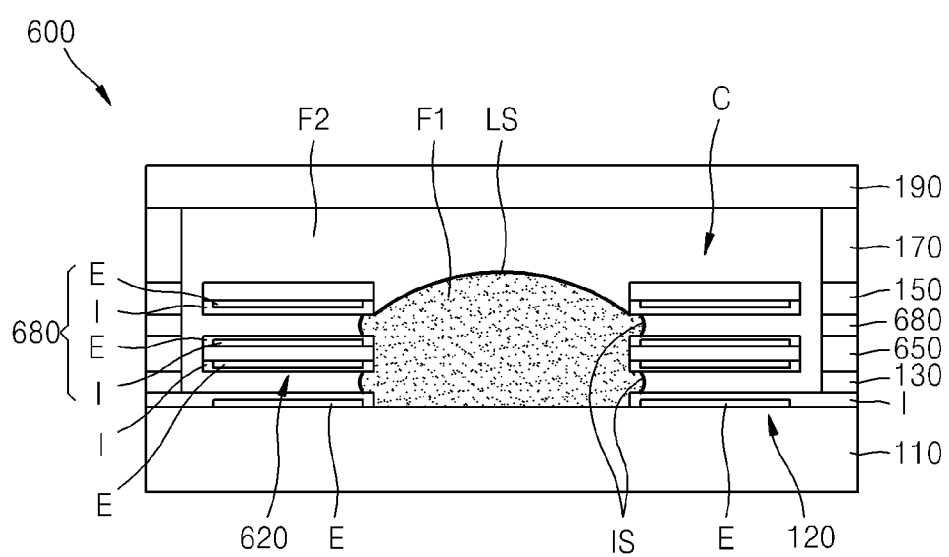
FIGS. 7A and 7B are schematic cross-sectional views of a curvature control device according to another embodiment, wherein a lens surface has a different curvature according to an applied voltage.
Figure 7B:
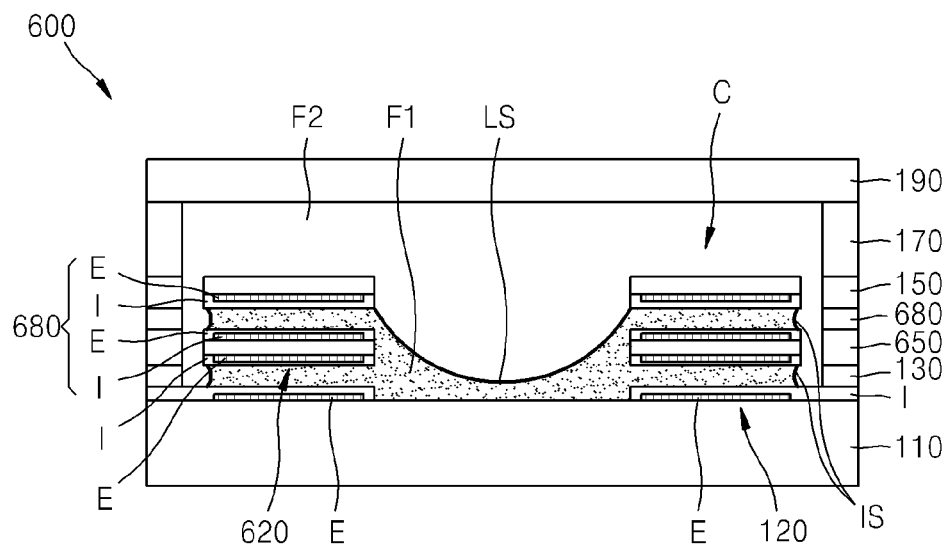

FIGS. 7A and 7B are schematic cross-sectional views of a curvature control device 600 according to another aspect of the exemplary embodiments, wherein a lens surface has a different curvature according to an applied voltage.

In the curvature control device 600 of FIGS. 7A and 7B, a change in a curvature of a lens surface is maximized. The curvature control device 600 includes a lower substrate 100, a first intermediate plate 150, and a second intermediate plate 650 disposed between the lower substrate 100 and the first intermediate plate 150. A plurality of through-holes corresponding to a first through-hole and a second through-hole are formed in the second intermediate plate 650. A third spacer 680 is disposed between the first intermediate plate 150 and the second intermediate plate 650. In FIGS. 7A and 7B, the curvature control device 600 includes only one second intermediate plate 650. However, the exemplary embodiments are not limited thereto, and the curvature control device 600 may include a plurality of the second intermediate plates 650.

An electrode portion includes a first electrode portion 120 and the second electrode portion 680. The first electrode portion 120 includes an electrode E formed on a lower substrate 110 and coated with an insulating material I. The second electrode portion 680 includes an electrode E which is formed at least one of under the first intermediate plate 150 and on the second intermediate plate 650 adjacent to the first intermediate plate 150, and is coated with an insulating material I. In FIGS. 7A and 7B, the electrode E coated with the insulating material I is disposed both under the first intermediate plate 150 and on the second intermediate plate 650, but the electrode E may be disposed on one of under the first intermediate plate 150 and on the second intermediate plate 650.

Also, the curvature control device 600 may further include a third electrode portion 620 formed under the second intermediate plate 650 to be adjacent to the lower substrate 110 and includes an electrode coated with an insulating material I. In FIGS. 7A and 7B, the curvature control device 600 includes both the third electrode portion 620 and the first electrode portion 120, but the curvature control device 600 may include only any one of the third electrode portion 620 and the first electrode portion 120.

A ground electrode (not shown) may be disposed in any position in a chamber C to contact a first fluid F when a voltage is not applied to any of the electrodes E.

Figure 8A:
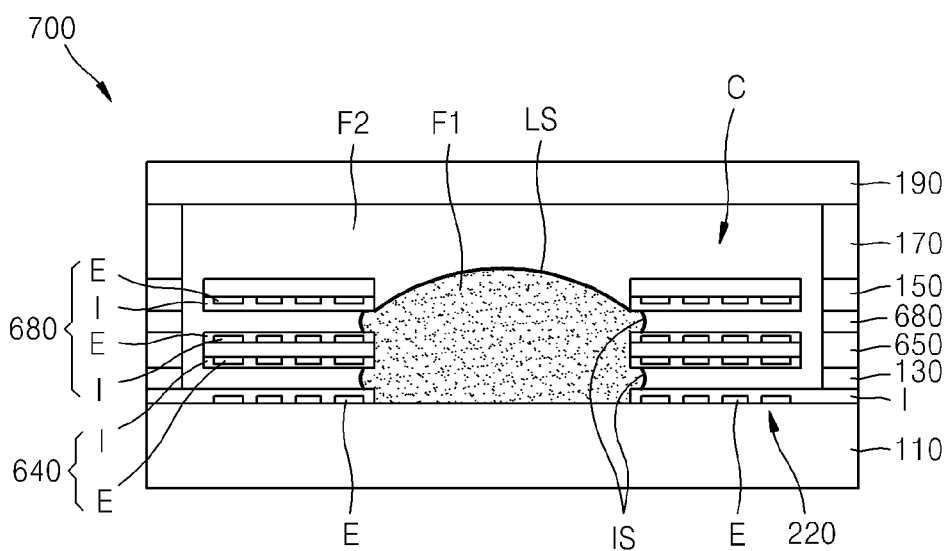
FIGS. 8A and 8B are schematic cross-sectional views of a curvature control device according to another embodiment, wherein a lens surface has a different curvature according to an applied voltage.
Figure 8B:
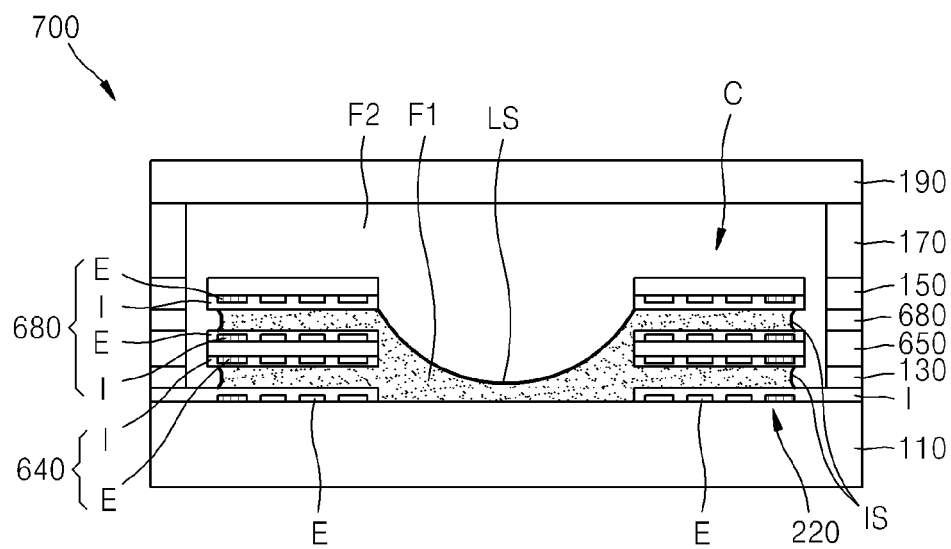

FIGS. 8A and 8B are schematic cross-sectional views of a curvature control device 700 according to another embodiment, wherein a lens surface has a different curvature according to an applied voltage. In FIGS. 8A and 8B, a first electrode portion 220, a second electrode portion 670, and a third electrode portion 640 each includes a plurality of electrodes E, and thus, a curvature of the lens surface is digitally-controlled according to selection of the electrode E.

The above-described device and method for controlling the curvature of a lens surface use a pressure type driving method using an electrowetting principle, and thus, the curvature of the lens surface may be changed only using an electric wiring instead of using an external pump or a mechanical apparatus.

The above-described curvature control device may maximize a change in a curvature of the lens surface, and may be a variable-focus lens used in, for example, an imaging apparatus.

Figure 9:
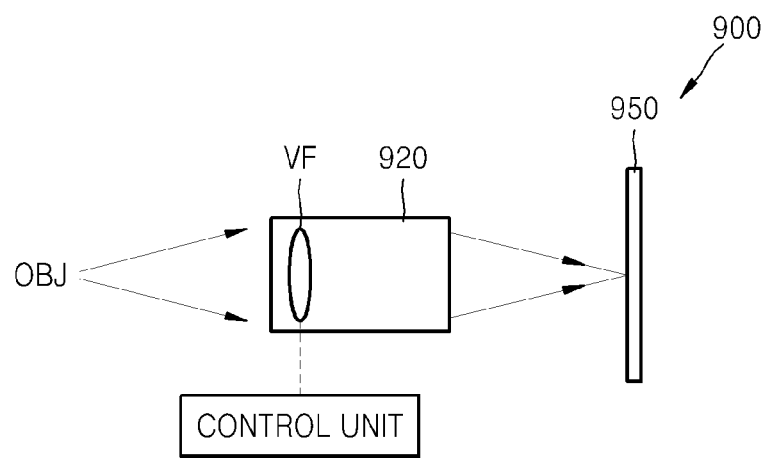
FIG. 9 is a schematic view illustrating imaging apparatus, according to an embodiment.

FIG. 9 is a schematic view illustrating an imaging apparatus 900, according to an embodiment.

Referring to FIG. 9, the imaging apparatus 900 includes an imaging lens unit 920 including a variable-focus lens VF, a control unit, and an image sensor 950.

The variable-focus lens VF may use any one of the above-described curvature control devices 100, 200, 400, 500, 600, and 700. The imaging lens unit 920 may further include, in addition to the variable-focus lens VF, one or more lenses when necessary. The control unit controls a voltage for adjusting a curvature of a lens surface of the variable-focus lens VF.

The image sensor 950 converts an optical image of an object OBJ formed by the imaging lens unit 920 into an electrical signal, and the image sensor 950 may be a charge coupled device (CCD), a complementary metal-oxide semiconductor (CMOS), or the like.

As the curvature of the lens surface of the variable-focus lens VF is adjusted, a focusing distance of the imaging lens unit 920 varies, and thus, auto-focusing or enlarging/downsizing of the object OBJ may be performed.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

What is claimed is:
1. A curvature control device comprising:
a first fluid that has a light transmitting property and a polar property;
a second fluid that has a light transmitting property;
a chamber in which the first fluid and the second fluid are accommodated without being mixed with each other, wherein a boundary surface between the first fluid and the second fluid comprises a first surface that is a lens surface and a second surface that induces a change in a curvature of the first surface;
a first intermediate plate that is disposed in the chamber and includes a first through-hole that forms a diameter of a lens corresponding to the first surface and a second through-hole that forms a path of the second fluid; and
an electrode portion configured to generate an electric field that changes a position of the second surface.

2. An imaging apparatus comprising:
an imaging lens unit comprising the curvature control device of claim 1;
a control unit that controls a voltage to adjust a curvature of a lens surface of the curvature control device; and
an image sensor that converts an optical image generated by the imaging lens unit into an electrical signal.

3. The curvature control device of claim 1, wherein the first fluid comprises a polar liquid, and the second fluid comprises a gas or a non-polar liquid.

4. The curvature control device of claim 3, wherein the electrode portion comprises a ground electrode disposed to contact the first fluid.

5. The curvature control device of claim 1, further comprising:
a lower substrate disposed under the first intermediate plate;
an upper substrate disposed on the first intermediate plate;
a first spacer portion disposed between the lower substrate and the first intermediate plate; and
a second spacer portion disposed between the first intermediate plate and the upper substrate, wherein the first and second spacer portions form walls defining chamber.

6. The curvature control device of claim 5, wherein the electrode portion comprises at least one electrode which is disposed under the first intermediate plate and is coated with an insulating material.

7. The curvature control device of claim 5, wherein the electrode portion comprises a first electrode portion comprising at least one electrode which is disposed on the lower substrate and is coated with an insulating material.

8. The curvature control device of claim 7, wherein the at least one electrode of the first electrode portion has a ring shape.

9. The curvature control device of claim 7, wherein the electrode portion further comprises a second electrode portion comprising at least one electrode which is disposed under the first intermediate plate and is coated with an insulating material.

10. The curvature control device of claim 9, wherein the at least one electrode of the second electrode portion has a ring shape.

11. The curvature control device of claim 5, further comprising at least one second intermediate plate that is disposed between the lower substrate and the first intermediate plate and has through-holes respectively corresponding to the first through-hole and the second through-hole.

12. The curvature control device of claim 11, wherein the electrode portion comprises:
a first electrode portion comprising at least one electrode which is disposed on the lower substrate and is coated with an insulating material; and
a second electrode portion which is disposed under the first intermediate plate or on the second intermediate plate adjacent to the first intermediate plate and comprises at least one electrode coated with an insulating material.

13. The curvature control device of claim 12, wherein the at least one electrode of the first and second electrode portions has a ring shape.

14. The curvature control device of claim 12, wherein the electrode portion further comprises a third electrode portion comprising at least one electrode which is disposed under the second intermediate plate adjacent to the lower substrate and is coated with an insulating material.

15. The curvature control device of claim 14, wherein the at least one electrode of the third electrode portion has a ring shape.

16. The curvature control device of claim 5, further comprising a step forming substrate that is disposed on the lower substrate, and has a third through-hole corresponding to the first through-hole.

17. The curvature control device of claim 16, wherein the electrode portion comprises at least one electrode which is disposed under the first intermediate plate and is coated with an insulating material.

18. The curvature control device of claim 16, wherein the electrode portion comprises a first electrode portion comprising at least one electrode which is disposed on the step forming substrate and is coated with an insulating material.

19. The curvature control device of claim 18, wherein the at least one electrode of the first electrode portion has a ring shape.

20. The curvature control device of claim 18, wherein the electrode portion further comprises a second electrode portion comprising at least one electrode which is disposed under the first intermediate plate and is coated with an insulating material.

21. The curvature control device of claim 20, wherein the at least one electrode of the second electrode portion has a ring shape.

22. A curvature control method comprising:
providing a chamber having an electrode portion comprising an electrode coated with an insulating material;
disposing first and second fluids in the chamber without being mixed with each other so that a boundary surface between the first fluid and the second fluid is formed, wherein the boundary surface comprises a first surface that is a lens surface, and a second surface that contacts the electrode portion, wherein the first and second fluids have light transmitting properties; and
controlling a curvature of the lens surface by changing a position of the second surface by applying a voltage to the electrode portion.

23. The curvature control method of claim 22, wherein the first fluid comprises a polar liquid, and the second fluid comprises a gas or a non-polar liquid.

24. The curvature control method of claim 22, wherein the controlling the curvature of the lens surface comprises adjusting a magnitude of the voltage applied to the electrode portion.

25. The curvature control method of claim 22, wherein the electrode portion comprises a plurality of electrodes, and the controlling the curvature of the lens surface comprises selectively applying voltage to at least one the electrodes.

* * * * *